United States Patent

[11] 3,609,684

[72] Inventor James P. Lipp
Oklahoma City, Okla.

[21] Appl. No. 32,262
[22] Filed Apr. 27, 1970
[45] Patented Sept. 28, 1971
[73] Assignee Honeywell Information Systems Inc.

[54] METHOD AND APPARATUS FOR STORING AND RETRIEVING INFORMATION BY ANALOG WAVEFORM CORRELATION TECHNIQUES
18 Claims, 8 Drawing Figs.

[52] U.S. Cl. .......... 340/146.3 C, 235/61.11 D, 340/149, 235/181, 340/174.1
[51] Int. Cl. .......... G06f 15/34, G06g 7/19
[50] Field of Search .......... 340/146.3 C, 149, 174.1, 172.5; 235/181, 61.11, 61.11 D; 325/325

[56] References Cited

UNITED STATES PATENTS

| | | | |
|---|---|---|---|
| 3,221,159 | 11/1965 | Cook et al. | 235/181 |
| 3,412,334 | 11/1968 | Whitaker | 325/325 |
| 3,496,544 | 2/1970 | Richmond et al. | 340/149 |

*Primary Examiner*—Thomas A. Robinson
*Attorneys*—Edward W. Hughes and Fred Jacob

ABSTRACT: A high-density storage and retrieval system is disclosed in which information is divided into a succession of groups of binary digits and stored as patterns of representations in an associated plurality of storage cells in a record medium. Upon scanning each recorded pattern of representations, a transducer generates an electrical signal having one discrete analog waveform uniquely corresponding to each of the recorded patterns of representations. A set of sample signals is then generated by sampling each discrete analog waveform at critical points. Each such set of sample signals is summed by correlation techniques requiring the adding and subtracting of the various individual sample signals to generate a sum signal. The magnitude of the sum signal is correlated to, or related with, a reference magnitude which is representative of a sum signal corresponding to a known analog waveform. As a result of this correlation, the magnitude of each sum signal is recognized as being indicative of a particular group of binary digits. The use of correlation techniques allows for the cancellation and averaging of analog waveform imperfections, and results in a sum signal which more accurately corresponds to the analog waveform detected.

INVENTOR.
JAMES P. LIPP
BY Edward W. Hughes
ATTORNEY

METHOD AND APPARATUS FOR STORING AND RETRIEVING INFORMATION BY ANALOG WAVEFORM CORRELATION TECHNIQUES

BACKGROUND OF THE INVENTION

The present invention relates generally to the storage and retrieval of information and, more particularly, to methods and apparatus for reducing errors in the magnetic storage and retrieval of binary digits (bits) in situations typically encountered in the electronic information processing art.

1. Field of the Invention

The invention may be utilized in high-speed information-processing systems where the information processed is supplied from any one of many types of external sources; such as, magnetic and thermoplastic recording tapes, magnetic discs, magnetic drums, magnetic arrays of thin film sites, magnetic cores, punched cards, documents bearing magnetic ink imprints, optically recognizable coded imprints, machine or hand-recorded marks, or other information source readily converted into electrical information signals.

In any data storage system, the primary objective is to accurately record and retrieve the desired information. In modern electronic information-processing systems, where information is exchanged between external storage devices and the system processor, precise and reliable information retrieval has become critical. The necessity for extracting desired information from electrical signals which have frequently been distorted by undesirable electrical interference from nearby equipment and other environmental sources, has further inhibited the development of reliable data storage and retrieval systems.

2. Description of the Prior Art

It is well known in the art that digital information can be stored in a storage medium having a magnetic surface and that information thus stored may be retrieved by providing relative movement between the medium and an electromagnetic transducer capable of detecting patterns of magnetic polarity changes or transitions between discrete areas on the surface of the storage medium. The detected pattern of magnetic polarity transitions, or "flux reversals" as they are commonly referred to, when interpreted in conjunction with an additional parameter (such as time or position) are indicative of the information stored in a plurality of discrete magnetized areas (termed "cells") on the surface of the storage medium. The pattern of magnetic polarity transitions thus detected is commonly referred to as a "code."

One prior art system for storing information on magnetic tape, drums, and discs is based upon a code which is implemented in the following manner: One binary digit is recorded as the absence of a polarity transition and the other binary digit as the presence of a polarity transition. The recorded information is read by an electromagnetic transducer and associated electronic circuits which produce electrical read signals having analog waveforms with amplitude peaks and nodes indicative of these presences and absences of polarity transitions. The analog waveform is then examined at predetermined times corresponding to each of the transition positions within the cell and a digital decision made for each position to determine which binary digit is being read at any particular time.

In the above-described prior art system, the storage media, transducer, and electronic circuits used to record and read the magnetically recorded information, taken together, result in the introduction of a variety of spurious signals referred to collectively as "interference" or "noise." The presence of noise often results in the distortion of read signal waveforms and an associated loss of information. By way of example, spurious signals may result from: (1) crosstalk from adjacent cells, as where fringing magnetic flux overlaps from one cell to an adjacent cell or where a misaligned transducer overlaps in a similar manner; (2) media defects that frequently result in erroneous signal pickups may take the form of excessive magnetic deposits, blemishes in recording material that becomes permanently magnetized, or magnetizable dust particles unavoidably deposited on the media surface during the process of manufacture; and (3) external sources such as the power supplies that furnish operating potentials to the electronic detection circuits and may take the form of intermittent signal spikes due to poor filtering or unpredictable DC signal levels due to poor regulation. The existence of any of the above-enumerated interference signals will generally result in introduction of significant distortion, and thus error into the analog waveform containing the information read from the surface of the recording media.

Accordingly, in the prior art, when a group of binary digits are read from a cell containing a group of transition positions, a critical point on the read signal waveform is examined to determine the presence or absence of a polarity transition at each of the transition positions of the cell. A crucial problem has existed because a multiplicity of digital decisions must be made for each cell and a corresponding multiplicity of opportunities for an interference-type error occur for each cell when interference signals distort the read signal waveform.

It is, therefore, an object of this invention to provide both an improved method and an improved apparatus for the retrieval of stored binary information in the presence of heretofore excessive interference signals.

Another object of this invention is to provide a more accurate method and a more reliable apparatus for the retrieval of stored groups of binary information by recognizing a discrete waveform which uniquely corresponds to each group of binary information to be read from the surface of the recording media.

Still another object of this invention is to provide information retrieval apparatus for retrieving stored groups of binary information by the recognition of discrete waveforms that correspond to each group of binary information read and by utilizing a minimum number of analog waveform recognition circuits.

SUMMARY OF THE INVENTION

In accordance with one aspect of the invention, a high-density information storage and retrieval system is provided wherein a representation of a triplet of binary digits is recorded as a pattern of transitions within each cell of a storage medium. This is accomplished by dividing each cell into four equal parts and recording a flux reversal at two or more of the four division points or transition positions in accordance with one of eight different transition patterns. Each one of the eight different transition patterns corresponds to one of eight different triplets of binary digits having binary values of from 000 to 111 or decimal values of from zero to seven.

The actual information represented by transitions within each of a succession of cells is detected as an electrical read signal containing a discrete analog waveform uniquely corresponding to each of the eight triplets of binary digits. (Accordingly, if each of the eight different triplets of binary digits are represented by transitions in successive cells, eight discrete analog waveforms are contained in a read signal indicative of the eight triplets of binary digits.)

Each discrete analog waveform is then sampled at critical points that correspond to the four transition positions in each cell and is used to generate a unique set of sample signals. The unique set of sample signals is then applied to a summing means or correlation network which responds by generating a sum signal having a magnitude indicative of the particular one of eight discrete analog waveforms sampled. The correlation network is adapted to generate an output sum signal having a predetermined magnitude when a unique set of sample signals of a reference discrete analog waveform are applied. The output sum signal generated by the correlation network in response to the unique set of sample signals of the reference discrete analog waveform is referred to as its "autocorrelation" sum signal. The output sum signals generated in response to the unique set of sample signals of each other discrete analog waveform are referred to as "cross-correlation" sum signals.

The correlation network utilized in the present invention provides for multiplying or weighting each individual sample signal before summing, so that the sample signals are effectively added and subtracted to generate a sum signal having the desired magnitude. The sum signal is then compared with a plurality of ranges of compare signals of progressively increasing magnitude. The particular range which most closely corresponds in magnitude to the sum signal magnitude is selected and, in response to this selection, an output signal is provided. The output signal is then converted into three binary digit signals indicative of the particular triplet of digits being read from the cell.

Accordingly, the present invention utilizes discrete analog waveform detection by correlation techniques to recognize the information read from each cell. Because a triplet of binary digits is read by recognition of a waveform which is based upon the summation of a plurality of sample signals (rather than a multiplicity of separate binary digit decisions as in the prior art) statistical protection against decision errors is achieved by the present invention. Furthermore, since the correlation network provides for the summation of an equal number of sample signals from a given read signal waveform, interference signals common to each sample signal are cancelled so that a substantial reduction in interference-type errors is achieved. The summation of a plurality of sample signals also reduces the effects of random interference signals, by averaging the effects of several interference signals at a plurality of sample times, and thus avoiding the detection of a single disastrous interference signal at a critical individual binary digits decision time. As a result of such interference cancellation, periodic types of errors are eliminated. Similarly, as a result of averaging, random interference-type errors are reduced.

Finally, the present invention utilizes a single correlation network to provide eight different sum signals corresponding to eight discrete waveforms. Therefore, a reduction in the number of analog waveform recognition circuits is achieved over systems requiring one correlation network for each discrete waveform to be recognized.

The invention is pointed out with particularity in the appended claims. However, other objects and advantages, together with the operation of the invention, may be better understood by reference to the accompanying detailed description of operation.

BRIEF DESCRIPTION OF THE DRAWINGS

The present invention may be more readily described by reference to the accompanying drawing in which.

DETAILED DESCRIPTION OF OPERATION

Figure 1:
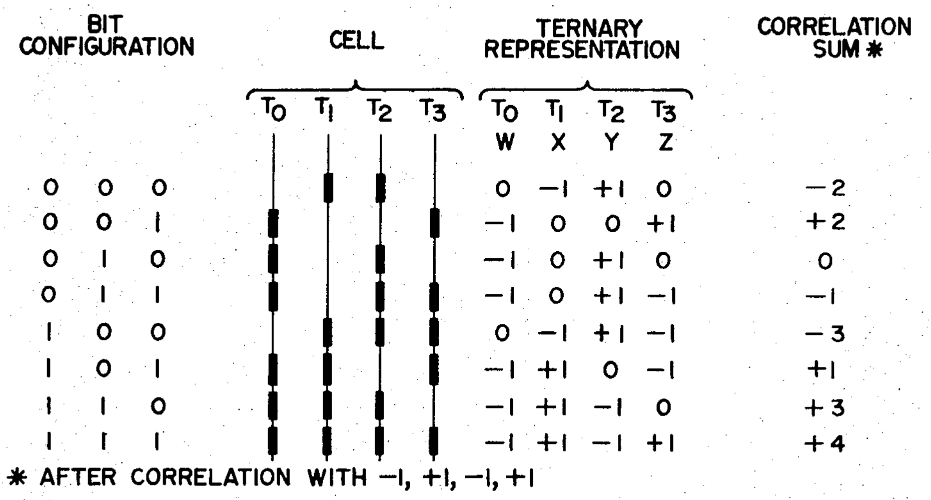
FIG. 1 is a diagram illustrating the manner in which various bit configurations are recorded within a cell area of a storage medium in accordance with the present invention together with ternary representations and analog waveform sample sums of corresponding analog waveforms derived from transitions at positions within a cell area as encountered by data recovery logic.

The manner in which information is stored as a pattern or is coded onto a recording medium may best be seen with reference to FIG. 1. In that Figure, there is shown the representation of a single data cell which corresponds to a specified area of storage medium onto which the pattern representing three binary digits is to be stored. Each cell is divided by uniformly spaced lines $T_0$, $T_1$, $T_2$, $T_3$, collectively referred to as T times. These T times designate the subdivisions of the data cell and at these times flux reversals are placed on the storage medium to represent eight possible pattern configurations.

An inherent property of reading magnetic recordings by means of a sensor or transducer which measures and produces an analog voltage signal having a waveform representing the change in magnetic flux direction or polarity is that the polarity of each successive voltage waveform peak or pulse must alternate. Therefore, if a given waveform peak is of a negative polarity, then the next waveform peak, whether it occurs immediately or after some space in distance or time, will be of a positive polarity. Thus, a magnetic flux reversal may be detected as generating a voltage waveform peak having either a positive or negative polarity. Further, in the positions where no transition appears, this condition is hereinafter referred to as being, ideally, a zero voltage level. Therefore, each transition position in a cell may be represented by a ternary digit wherein a ternary "0" represents no pulse, a ternary "+1" represents a positive polarity voltage peak and the ternary "−1" represents a negative polarity voltage peak.

As illustrated in FIG. 1, a ternary notation in the form of a pattern of ternary digits may be used to represent the absence or presence of a given polarity transition at positions $T_0$, $T_1$, $T_2$ and $T_3$ of a cell or a corresponding polarity voltage level at a set of waveform critical points represented by W, X, Y and Z.

By establishing the three following rules regarding code characteristics of the particular code illustrated in FIG. 1, the ternary digit voltage levels representing transition positions $T_0$–$T_3$ may be utilized to recognize each of the eight waveforms representing the eight pattern configurations. The following rules for the illustrative code apply at the input to a data retrieval circuit:

1. No four ternary digit patterns will start or end with two consecutive nonreversals or zeros.

2. By convention, the first reversal in any pattern will be considered a digit corresponding to a negative magnetization or a −1 direction.

3. Successive reversals must alternate in polarity.

By observing the preceding three rules, the first nonreversal position will always be processed to produce a negative polarity sample signal. The cell positions or waveform critical points and corresponding polarity may be represented by the ternary digits as illustrated in each column corresponding to positions within a cell or waveform critical points.

The full four ternary digit representation of waveform sample voltage levels at critical points or sampling points W, X, Y and Z corresponding to cell positions $T_0$, $T_1$, $T_2$ and $T_3$ are weighted by (multiplied by) the values −1, +1, −1 and +1, respectively, such that they may be summed together by a suitable correlation network to provide a distinct correlation sum for each of the eight bit configurations illustrated. As illustrated in FIG. 1, a unique set of sample signals represented by the ternary digits in each column is provided for each of the eight triplets of binary digits.

The code illustrated in FIG. 1 has an information content of three data bits per cell and self-synchronizes or self-clocks data read from the storage medium. By self-clocking it is meant that flux reversals used to designate data occur at such intervals of time that they are also used to maintain synchronization within the system. One property of the code is the avoidance of more than two successive nonreversals. Clocking signals may be received from selected positions of from all four T positions illustrated in FIG. 1.

Figure 2:
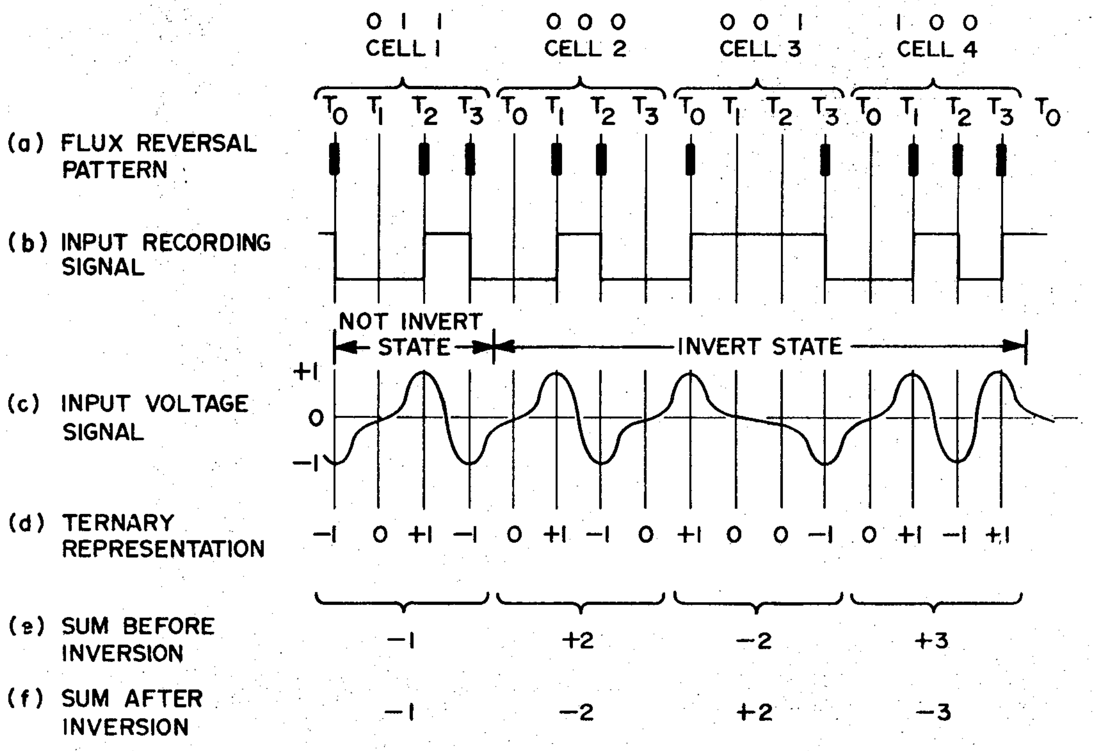
FIGS. 2(*a*), 2(*b*), 2(*c*), 2(*d*), 2(*e*) and 2(*f*) are diagrams illustrating arbitrary data patterns and their corresponding representations of flux reversal locations, write current, read voltage waveform, ternary representation and correlation sums before and after inversion, respectively, at various points in the data storage and retrieval system.

FIG. 2(*a*) shows the flux reversal locations or patterns which would be written onto a magnetic recording surface for the 12-bit configuration shown which is read left to right as 011, 000, 001 and 100. These 12 bits are stored in four cells with the 011 bit configuration recorded as flux reversals at $T_1$, $T_2$ and $T_3$ positions of the first cell. The 000 bit configuration is written as flux reversals at $T_1$ and $T_2$ positions of cell 2, the 001 bit configuration is written as flux reversals at $T_0$ and $T_3$ positions of cell 3 and the 100 bit configuration is written as flux reversals at $T_1$, $T_2$ and $T_3$ positions of cell 4.

With reference to FIG. 2(*b*), the flux pattern of FIG. 2(*a*) is illustrated showing one of the two possible idealized current waveforms or waveshapes which is applied to the recording head winding of a transducer in order to store, on a suitable medium, magnetization patterns according to the invention which are representative of a train of flux reversals selected from the bit configurations of FIG. 1. A second possible wave train for the same data would merely be a polarity reversal of FIG. 2(*b*).

FIG. 2(*c*) illustrates a resultant voltage waveform corresponding to the flux reversal pattern illustrated in FIG. 2(*a*) and 2(*b*) which may be obtained from a transducer sensing the flux reversal pattern. FIG. 2(*c*) also illustrates times identified as INVERT and NOT INVERT indicating INVERT times where necessary polarity inversion must be accomplished in a manner to be described hereinafter. It is seen that polarities indicated in FIG. 2(*c*) will have to be modified in some cases by polarity inversion to insure that the peak level of each cell waveform will be negative before correlating the waveform of a cell with a reference waveform. For example, between the $T_3$ time of cell 1 and the $T_0$ time of cell 2, a polarity inversion or 37 invert" is required to maintain the convention previously set forth in rule 2, whereby the first reversal of a cell must correspond to a negative polarity or ternary digit −1 signal. The switch or polarity invert, as it will be referred to hereinafter, for inversion of polarity of the incoming input voltage signal will occur when the last pulse in the previous cell is of a negative polarity. The reversal must be executed in order to satisfy the convention set forth for identifying each of the eight patterns corresponding to a waveform representing transitions appearing in the $T_1$–$T_3$ positions of the cell. Equivalently, whenever a cell contains an odd number (3) of pulses, the inversion state must be reversed after $T_3$ time of that cell.

FIG. 2(*d*) illustrates the ternary representations of waveform level and polarity which may be sampled only at critical points W, X, Y and Z of a waveform which will correspond to information contained in the four cells illustrated. FIG. 2(*e*) illustrates a correlation sum corresponding to the ternary representations of FIG. 2(*d*) when waveform samples at points W and Y corresponding to ternary digits at $T_0$ and $T_2$ are multiplied by a weighing factor of (−1) and applied to a correlation network for summing together with (+1) factored samples at points X and Z. FIG. 2(*f*) illustrates the sums of FIG. 2(*e*) following polarity inversion where necessary to maintain the conventions previously described.

Figure 3:
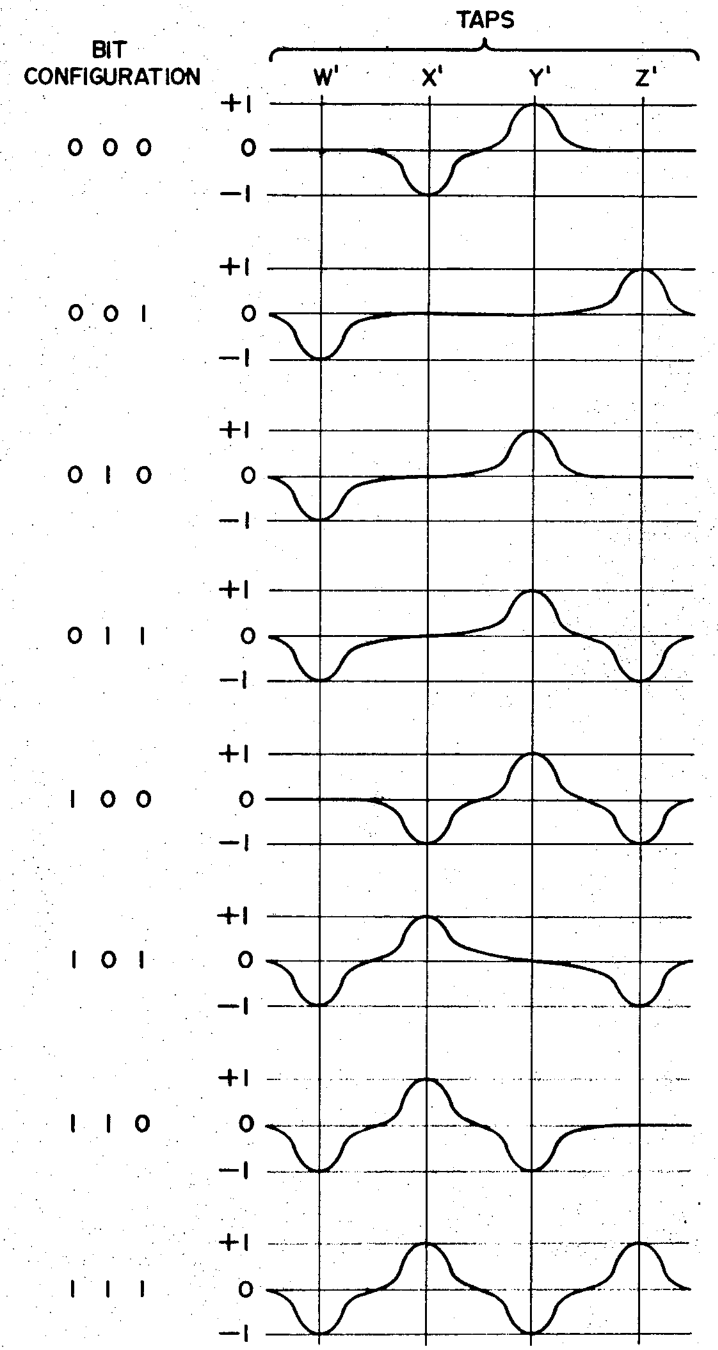
FIG. 3 illustrates eight bit configurations adapted to be employed with the embodiment of this invention and their corresponding waveforms when read.

FIG. 3 illustrates analog signal waveforms corresponding to each of the eight-bit configurations and corresponding eight sums illustrated in FIG. 1. In order to provide for proper correlation of each discrete waveform with a reference waveform, which may be, by way of example, the waveform illustrated for the 111 bit configuration, it is necessary that waveform sample signal voltage levels be provided at the proper times and each sample signal weighted by an appropriate weighting factor. Weighting factors, which may be, by way of example, (−1) for the sample signals at points W and Y and (+1) for the sample signals at points X and Z may be used in order that the code may provide for eight different sum signals. Accordingly, each waveform may be recognized by a corresponding one of the eight sum signals which can be transformed into a respective bit configuration.

Figure 5:
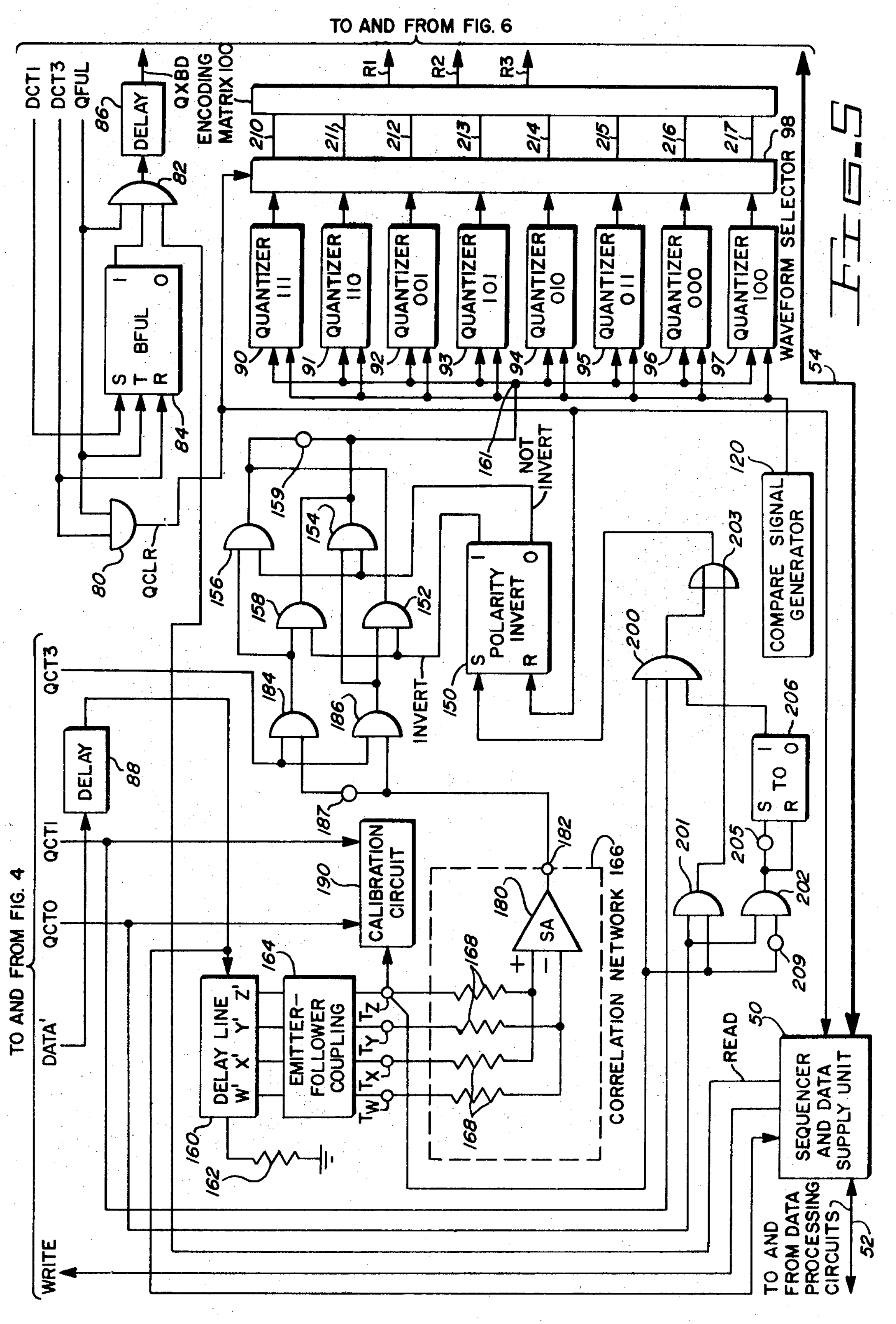
Figure 6:
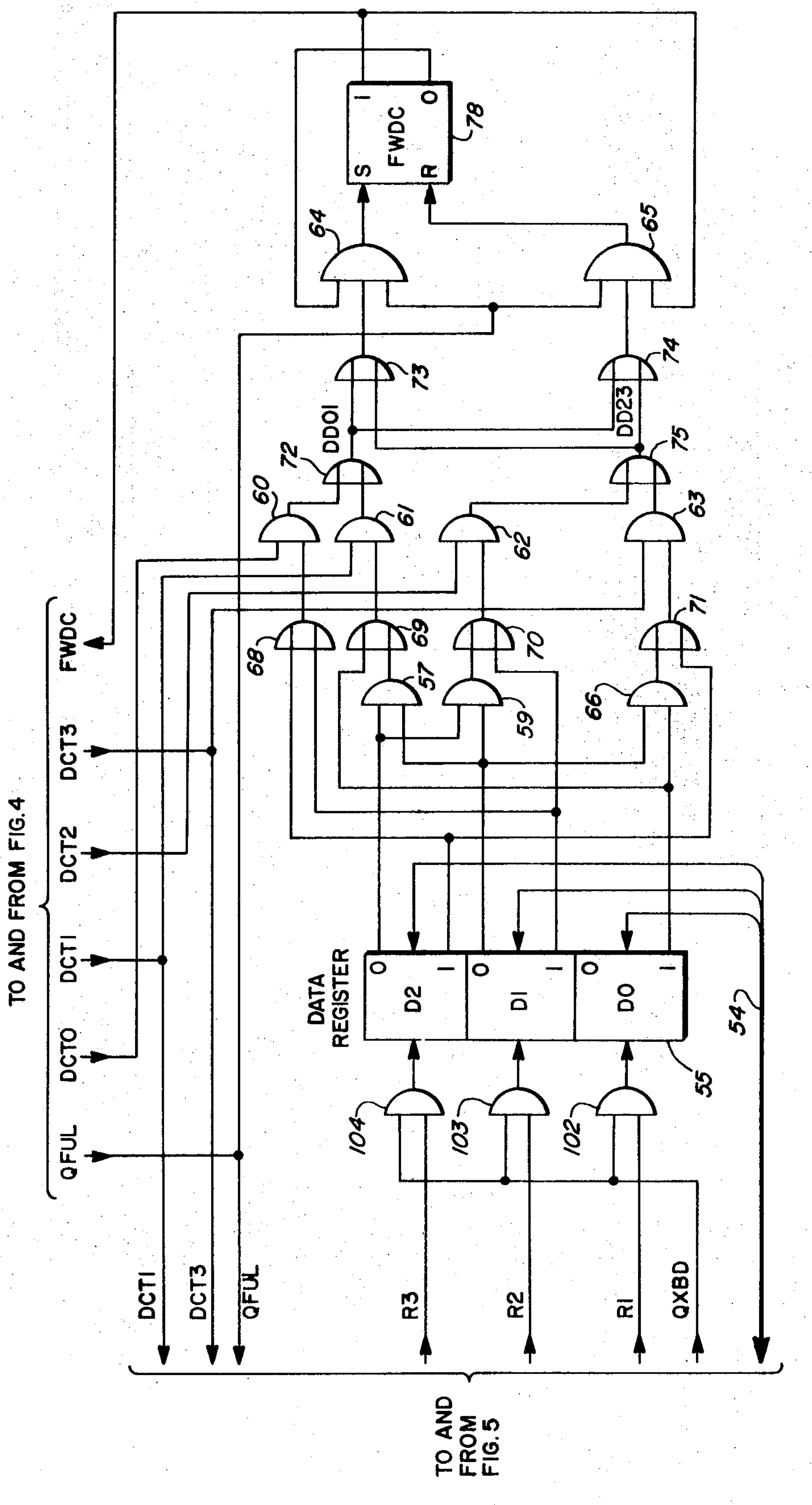
Figure 7:
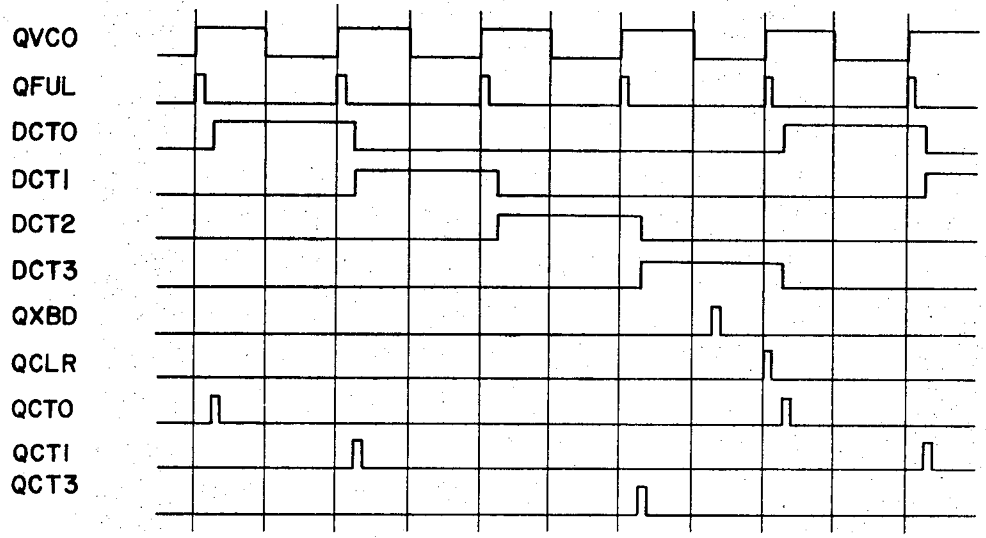
FIG. 7 is a timing diagram useful in understanding the representations of FIGS. 4, 5 and 6.

For a more complete understanding of the invention, reference is made to the logic schematics of FIGS. 4, 5, 6 and 8 and their accompanying timing diagram illustrated in FIG. 7. The signals to be described will be referred to as high or enabling signals and low or disabling signals. The logic illustrated is of conventional nature. That is, an AND-gate is a logic element which provides at its output a high or enabling signal when each of its input signals are enabling signals. An OR-gate is a multiple input logic element which provides an enabling or high output signal when one or more of its input signals is a high or enabling signal. The term flip-flop, as is used in the present description, designates a bistable multivibrator with its two stable states being a set state in which there is a binary 1 or a high or enabling signal t its 1-output terminal and a reset state in which there is a binary 0 or low or disabling signal at its 1-output terminal.

Two types of flip-flops are utilized in the present description. The first type of flip-flop has two input terminals, a S (set) terminal, and a R (reset) terminal. In this device, a high or enabling signal applied to the S terminal will place the flip-flop into its set state and a high or enabling signal applied to the R terminal will place the flip-flop into its reset state. The other type of flip-flop differs from that just described only with respect to the inclusion of a third input terminal designated T. Flip-flops thus designated are trigger flip-flops and their operation differs from that previously described in that the flip-flop will change its state only upon the application of a high or enabling signal at the T terminal simultaneously with a high or enabling signal applied to either of the S or R input terminals.

TIMING

Figure 4:
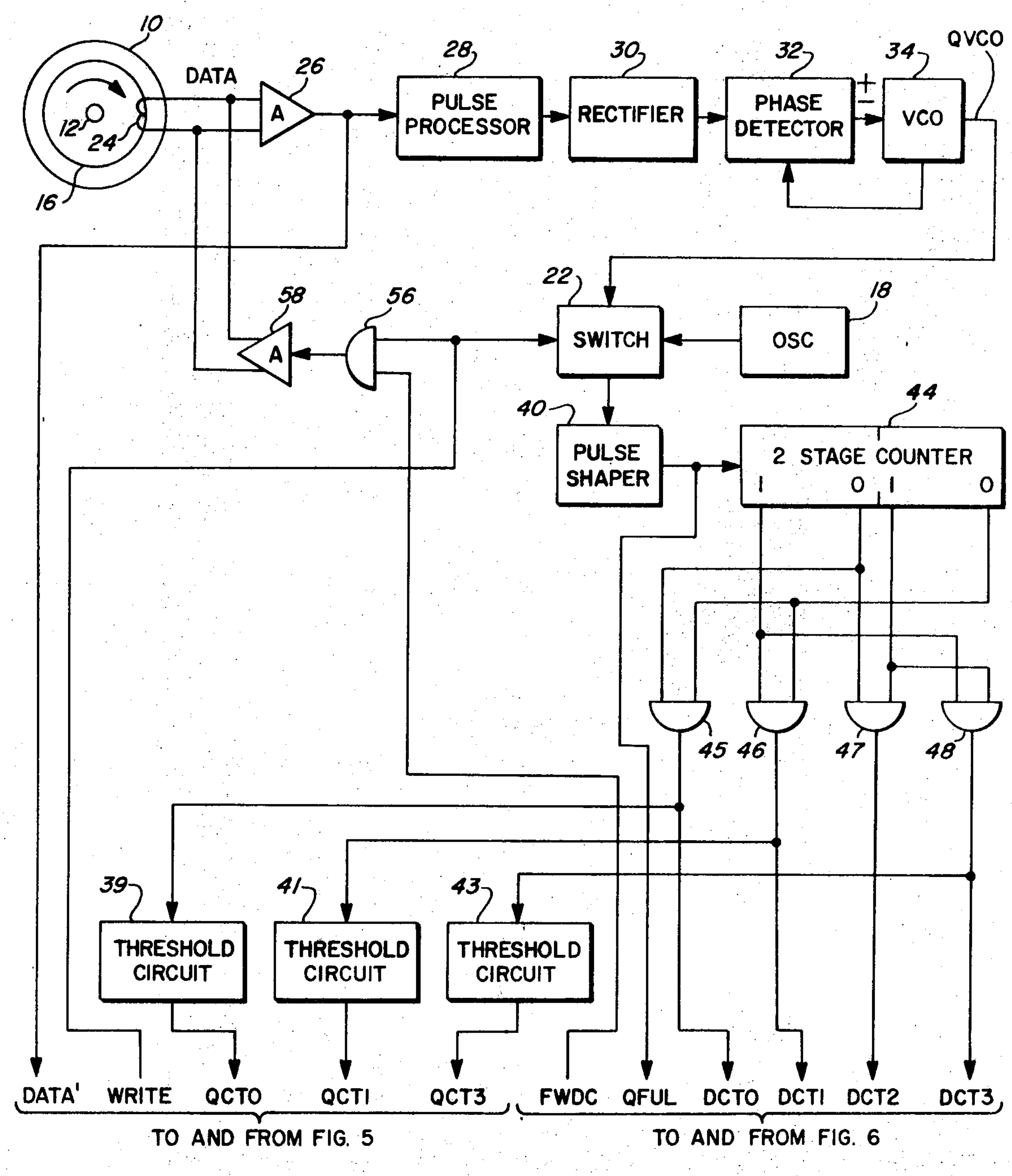
FIGS. 4, 5 and 6 are schematic diagrams illustrating a preferred means for implementing the present invention.

In FIG. 4, a storage medium 10 in the form of a disc having a magnetizable coating is mounted for rotation in a clockwise direction about an axis 12 by a suitable drive means, not shown. An information track 16 arranged on storage medium 10 is provided for storing intelligence in the form of discrete magnetically polarized areas. A suitable transducer 24 is arranged adjacent track 16 and serves to generate electrical signals in response to relative motion between disc 10 and transducer 24 in response to the changing polarity of discrete areas on the track. The output signals thus generated are amplified by an amplifier 26 and applied to a pulse processor 28 and on a line designated DATA′ to a suitable delay means 88, FIG. 5. The output signals on the DATA′ line provide a waveform having analog voltage levels corresponding to the polarity of flux reversals, which may be, for example, in the case of bit configurations 011, 000, 001 and 100, as represented by the waveform shown in FIG. 2(*c*), applied to read logic illustrated in FIG. 5.

Pulse processor 28 performs a series of cascaded operations. The first operation differentiates the amplified voltage waveform from amplifier 26 and provides a waveform having zero amplitude crossings corresponding in time to the peaks of an input signal from transducer 24. The signal is then amplified, clipped and again differentiated which shapes a series of derived signals into positive and negative pulses approximately 180° out of phase with the peaks of the signals from transducer 24.

Rectifier 30 transforms the pulses from pulse processor 28 into a series of unipolarity pulses which are then applied to a phase detector 32. The output of phase detector 32 is an error sense voltage which is transmitted to a voltage-controlled oscillator 34 whose output signals are designated QVCO. The square QVCO signals have a frequency, in the embodiment disclosed, of four times the repetition rate of the data cell occurring in the information track 16 (see FIG. 6). The output signals of the voltage controlled oscillator 34 are transmitted via a feedback loop to the phase detector 32. Phase detector 32 compare the phase of its input signal from rectifier 30 with the output signal of the voltage-controlled oscillator 34 to provide an output voltage signal, either positive or negative, representative of the difference in phase between these two signals. This output voltage signal is supplied to the voltage-controlled oscillator 34 and causes the oscillator 34 to vary its output frequencies such that the output signal QVCO is in close synchronism with the basic frequency of the signals being derived from the information track of disc 10. As used herein, information and data are synonymous.

The QVCO signal from oscillator 34 is transmitted to an input terminal of switch logic block 22. Another input signal transmitted to block 22 is from oscillator 18 which generates signals which are similar to those generated by the voltage-controlled oscillator 34 having a frequency, in the present example, of four times the repetition rate of the data cell occurrence.

Switch control logic block 22 performs the function of selectively switching either the signals from the voltage-controlled oscillator 34 or from a precision oscillator 18 to a pulse shaper 40. During a read operation, switch block 22 selectively applies the signals from voltage-controlled oscillator 34 to pulse shaper 40 and during a write operation applies the signals from oscillator 18 to pulse shaper 40 as hereinafter described. Switch block 22 may, by way of example, utilize a relay operable to perform the switching operation in response to the presence or absence of a high or enabling write signal.

The QUCO signal applied by means of switch logic block 22 to pulse shaper 40, the output of which is designated as QFUL, may be seen in FIG. 6 as a train of narrow, positive-going pulses occurring at the frequency rate of the QVCO signal. The QFUL signal is supplied as an input signal to a two-stage counter 44 which is essentially two flip-flops in a counter configuration designed to step through the binary designations of zero through three. The four output terminals of counter 44 are applied as input signals to four AND-gates 45 through 48 in a manner such that the output signals of these four AND-gates, DCTO, DCT1, DCT2 and DCT3 (FIG. 4, divide the cell times into four equal parts. Signals DCT0, DCT1 and DCT3 are applied as input signals to a corresponding one of threshold circuits 39, 41 and 43 to derive output signals QCT0, QCT1 and QCT3. Threshold circuits 39, 41 and 43 may be, by way of example, well-known Schmidt trigger circuits which respond to a signal exceeding a predetermined threshold level to provide a single output pulse. The signals thus far described provide the necessary timing for the writing of information onto or reading the information from disc 10.

WRITE OPERATION

During the WRITE cycle of the disclosed embodiment, information is transmitted to a sequencer and data supply unit 50, FIG. 5, via an information bus 52 from suitable sources such as, for example, data processing circuits. This information enters thy unit 50 prior to the beginning of a write cycle and contains a three-bit configuration of information or data and a suitable indicating designation that this is to be a "-WRITE" operation (a WRITE command). This information normally comes from another component within the data processing system, for example, a data processor.

In FIG. 5, unit 50 supplies the configuration of data via a data bus 54 to a three-bit data register 55, FIG. 6, which acts as a temporary holding register. Because this is a WRITE operation, unit 50 supplies a WRITE signal to the timing logic of FIG. 4 where it is provided as one input signal to AND-gate 56 and as an input signal to switch logic block 22. The WRITE signal provided to logic block 22 provides for switching the input signal from oscillator 18 to pulse shaper 40 for deriving the timing signals DCT0, DCT1, DCT2 and DCT3. AND-gate 56 gates the WRITE signals through an amplifier 58 to transducer 24 for writing data on disc 10.

The data register 55 is a three bit register comprised of three flip-flops designated, respectively, D0 through D2. Data is inserted into this register in parallel from a decoding network during the read operation and transmitted from the register to an encoding network during the WRITE operation.

The three bits in data register 55 provide output signals from flip-flops D0 through D2 for transmittal to a plurality of AND-gates 57 and 59 through 66 and to a plurality of OR-gates 68 through 75 for controlling a wire data flip-flop 78 designated as FWDC.

FIG. 1 illustrates the possible contents of the data register when any of the eight triplets or eight-bit configurations may be recorded. For the case when the data register contains a 000 bit configuration, the flip-flops D0 through D2 will contain binary zeros. Upon the assumption that the D0 through D2 flip-flops each contain binary zeros, OR-gate 68 will be disabled. A low or disabling output signal from OR-gate 68 during the occurrence of a DCT0 signal disables AND-gate 60, thus providing a low or disabling output signal to OR-gate 72.

The output signal DD01 from OR-gate 72 forms one of the input signals to each of OR gates 73 and 74. The output signals from OR-gates 73 and 74 form, respectively, input signals to each of AND-gates 64 and 65. One of the terminals of each of AND-gates 64 and 65 are connected to receive the QFUL signal and also the 1 and 0 output signals of the FWDC flip-flop 78. Thus, it is seen that each time the DD01 signal is at a high or enabling level the FWDC flip-flop 78 will change its state.

The 1-output signal of FWDC flip-flop 78 is transmitted to one of the input terminals of AND-gate 56, FIG. 4. The other input signal to AND-gate 56 is the WRITE signal from unit 50, FIG. 5. With the enabling and disabling of AND-gate 56 by the 1-output signal of flip-flop 78, a signal is transmitted from AND-gate 56 to amplifier 58 which transmits a corresponding signal to transducer 24 to write a flux transition on data track 16 of disc 10.

For the case of a 000 bit configuration in data register 55, FIG. 6, the DD01 signal at the output terminal of OR-gate 72 will be of a low or disabling level which is transmitted to one input terminal of each of OR-gates 73 and 74 which in turn provide low or disabling output signals to one of the input terminals of AND-gate 64 and 65. AND-gates 64 and 65 provide low or disabling output signals to the S and R input terminals, respectively, of FWDC flip-flop 78. Flip-flop 78 will not change state at the DCT0 time and a transition or flux reversal will not be written at the $T_0$ position of the data cell.

With the 000 bit configuration in data register 55, the signals at the 0-output terminals of flip-flops D1 and D2 applied to the input terminals of AND-gate 57 will both be high or enabling signals. AND-gate 57 is thereby enabled which, in turn, provides a high or enabling signal to enable OR-gate 69 for applying a high or enabling input signal to AND-gate 61. Thus, with the occurrence of a DCT1 signal at a second input terminal of AND-gate 61 conjunction occurs in AND-gate 61 and it will be enabled to provide a high or enabling signal to the two input terminals of OR-gate 72. OR-gate 72 is thereby enabled to provide a high or enabling DD01 signal to OR-gates 73 and 74. The output signals of these two OR gates form, respectively, input signals to each of the AND-gates 64 and 65. Thus, it is seen that with a high or enabling DD01 signal and if FWDC flip-flop 78 is in a reset state, then AND-gate 64 will be enabled and upon the occurrence of a QFUL signal a high or enabling input signal will be transmitted from AND-gate 64 to the S input terminal of flip-flop 78. Thus, at a DCT1 time, flip-flop 78 will be placed in a set state, providing a high or enabling FWDC signal from its 1-output terminal for transmittal to one input terminal of AND-gate 56. With a high or enabling write signal present at a second input terminal of AND-gate 56, conjunction will occur in AND-gate 56 and a high or enabling output signal will be transmitted to amplifier 58. An output signal from amplifier 58 is then transmitted to transducer 24 to write a flux transition on the data track 16 of disc 10. This transition is written at the T1 position of a data cell in which a 000 bit configuration is to be written. Similarly, if FWDC flip-flop 78 was in a set state and DD01 was enabled, FWDC would be reset at the time of DCT1. Hence, AND-gate 56 will provide a current reversal at time DCT1 for a 000 data configuration.

With reference to FIG. 6, it is seen that the 000 bit configuration in flip-flops D1 and D2 of data register 55 provide high or enabling output signals from its 0 terminal to AND-gate 59. Thus, AND-gate 59 is enabled to provide a high or enabling signal for enabling OR-gate 70 which provides a high or enabling output signal to one input terminal of AND-gate 62. At the occurrence of a DCT2 signal, AND-gate 62 is enabled to provide a high or enabling output signal for enabling OR-gate 75 which, in turn, provides a high or enabling output signal designated DD23 to one input terminal or each of OR-gates 73 and 74. OR-gates 73 and 74 are thereby enabled to provide high or enabling output signals to each of AND-gates 64 and 65. Whatever the setting of FWDC, as described in the previous paragraph, FWDC 78 will reverse its state, again causing a reversal of the write current in transducer 24. This transition is written at the $T_2$ time of a data cell in which is being written the bit configuration 000.

Flip-flop DO, shown in FIG. 6, contains a binary 0 and being in a reset state, provides a low or disabling output signal from its 1-output terminal to disable AND-gate 66, and flip-flop D1 provides a low or disabling output signal from its 0-output terminal to also disable AND-gate 66. The D2 flip-flop also contains a 0 to provide a low or disabling output signal at its 1-output terminal for transmission to one of the input terminals of OR-gate 71. OR-gate 71 was previously disabled by the output signal from disabled AND-gate 66 and thus provides a low or disabling output to one input terminal of AND-gate 63. Thus, at a DCT3 time, AND-gate 63 is not enabled and a low or disabling output signal is transmitted by it to OR-gate 75. OR-gate 75 thereby provides a low or disabling output signal to both OR-gates 73 and 74. The disabled OR-gates 73 and 74 provide low or disabling input signals to AND-gates 64 and 65 which are, therefore, disabled to prevent the change of the state of flip-flop 78. Since the flip-flop 78 does not change states, the FWDC output signal will not provide for the writing of a flux transition at the $T_3$ time of the cell in which a bit configuration of 000 is to be written.

Accordingly, for a 000 bit configuration, the logic of FIGS. 4 and 6 provides for the writing of flux reversals at the $T_1$ and $T_2$ times of the cell. The encoding network provides for the writing of flux transitions at the required $T_0$ through $T_3$ positions of a data cell in a similar manner for any of the other eight-bit configurations in accordance with the respective patterns of flux transitions illustrated in FIG. 1. Each successive configuration written is successively transferred from unit 50 into data register 55 for recording in the manner previously described.

With reference to FIG. 7, at the end of a DCT3 time and the occurrence of the next QFUL signal an AND-gate 80, FIG. 5, is enabled to provide a high or enabling QCLR signal to unit 50. A QCLR signal is transmitted by enabled AND-gate 80 for utilization by unit 50 to control the insertion of a new three-bit configuration via a bus 52 into data register 55 in the manner previously described.

While the foregoing description of the write operation has been explained with respect to timing initially derived from a precision oscillator, it is not, however, a requirement of the present invention. If desired, the output of a timing track on the storage medium, in this case a disc, could be utilized to initiate generation of the desired timing pulses.

READ OPERATION

The timing signals in the read operation of the present invention are generated from the data track in the manner previously described. The use of data signals for timing purposes as opposed to the oscillator previously described for the write operation is a function of switch 22.

With the initiation of a read operation, a read command received via bus 52, by unit 50, FIG. 5, results in the generation of a READ signal by unit 50. This READ signal forms one signal to a three-input terminal AND-gate 82, the output signal of which is applied through a suitable delay means 86 to generate a QXBD signal. This QXBD signal affects the parallel transfer of the output of an encoding matrix 100 to the data register 55, FIG. 6, via leads identified as $R_1$, $R_2$ and $R_3$. The QFUL signal is transmitted to a second input terminal of AND-gate 82 with its third input signal being transmitted to it from the 1-output terminal of a BFUL flip-flop 84.

The BFUL flip-flop 84 is placed into its set state by the QFUL signal at the end of the DCT1 signal, FIG. 4, and into its reset stage by the QFUL signal at the end of the DCT3 signal from counter 44. The QXBD signal from the output terminal of gate 82 is delayed by delay means 86 for a period which may be, for example, one-half the DCT3 uptime to permit the transfer of the encoded output from matrix 100 to the data register 55. During the DCT3 time following the entry of an information bit configuration being read at $T_3$ position of a cell, a QXBD signal, FIG. 7, is provided at approximately mid $T_3$ uptime to initiate the parallel transfer of data being read from each individual cell. The BFUL flip-flop 84 employs the QFUL signal to trigger its change of state upon the occurrence of one of the DCT1 and DCT3 signals.

In order to assure proper sampling times of a waveform corresponding to each data cell at position $T_3$ of each data cell, it is necessary that the incoming data from a track be preceded by a synchronizing code which may, for example, be a sequence of ones and zeros in a specified pattern, followed by an address of the data which is to be read. Since the synchronization process is not material to this invention, it will not be described in detail. However, a specified sequence of selected bit configurations are normally used for phasing. A header pattern to precede data to be read may, by way of example, utilize the transition patterns of FIG. 1 corresponding to the 000 or 001 or 110 bit configurations in a series followed by a special transition pattern. The resulting header pattern would have a series of the previously mentioned patterns corresponding to certain bit configurations followed by a series of special transition patterns which are in turn followed by an address and other header contents and subsequently followed by data. The special synchronizing pattern would never appear in a stream of data, or shift thereof, and would, therefore, be detected as a start transition pattern to control the start of a read operation at the required portion of a cell.

Electrical analog signal waveforms derived by transducer 24 and indicative of the data recorded on a data track 16, FIG. 4, of disc 10 are supplied from the amplifier 26 through a suitable delay means 88 to one input terminal of a sampling means which may be, by way of example, a transmission means or a delay line 160.

Waveforms from the output terminal of delay means 88 are passed to the delay line 160 where they are stored as traveling waves. The delay line 160 is terminated by a resistor 162 having a resistance value equal to the value of the characteristic impedance of the delay line 160 so that there will be no reflection of successive voltage amplitudes The delay line 160 is provided for four equally spaced taps identified as W', X', Y' and Z' coupled to terminals $T_w$, $T_x$, $T_y$ and $T_z$ by an emitter-follower coupling circuit 164. Each voltage amplitude or level of the waveform produced by the transducer 24, FIG. 4, is successively stored in the delay line 160 such that when the entire waveform has been produced it is stored as a traveling wave which can be sampled at several critical points simultaneously.

Graphs of traveling waves corresponding to waveforms produced by sensing the bit configurations 000 through 111 in cells on the disc track 16 of FIG. 4 are illustrated in FIG. 3. The waveforms are depicted at the time when the leading voltage peak for all waveforms except those for 000 or 100 appears at terminal W. The corresponding voltage amplitude at each terminal $T_w$, $T_x$, $T_y$ and $T_z$ is plotted as the ordinate, but it should be noted that the reference voltage is arbitrary and that the ordinates may be assigned any desirable value. The abscissas of the graphs are the taps corresponding to terminals $T_w$, $T_x$, $T_y$ and $T_z$ which are coupled to the delay line.

When the waveforms of the bit configurations 000 through 111 are stored as traveling waves in the delay line 160 in the position defined by the respective graphs of FIG. 3, they are stored in a position which will hereinafter be referred to as the "reference" position. Continuously changing signal levels of the traveling wave are presented at the terminals $T_w$, $T_x$, $T_y$ and $T_z$ but, as will be more fully explained, only those signal levels present when the waveform to be recognized is in the reference position are important.

The signals which appear at certain of the terminals $T_w$, $T_x$, $T_y$ and $T_z$ are applied simultaneously to the correlation network 166. Correlation network 166, comprising a plurality of resistors 168 and a summing amplifier 180, is designed to receive a unique set of sample signals in the form of signal levels from terminals $T_w$, $T_x$, $T_y$ and $T_z$ and to provide an output sum signal representing the summation of the sample signals from terminals $T_w$, $T_x$, $T_y$ and $T_z$ which are applied through resistors 168 to a positive and a negative terminal of summing amplifier 180. Only one correlation network is illustrated for illustration purposes, the one correlation network 166 being utilized for providing a differing sum signal representing each of the eight discrete waveforms corresponding to the eight triplets or eight different bit configurations illustrated in FIG. 1 which are to be recognized. However, separate correlation summing means networks may be employed in a recognition system wherein different correlation network is required and designed to recognize each discrete waveform.

The correlation network 166 is designed to provide a different sum signal representing each of the eight discrete waveforms derived by sensing the pattern of transitions corresponding to each of the eight-bit configurations or triplets 000 through 111, illustrated in FIG. 3. When signal samples of each of these waveforms are applied to correlation network 166, a signal is obtained at an output terminal 182 corresponding in magnitude to the algebraic sum of the analog waveform samples which have been present at the $T_w$, $T_x$, $T_y$ and $T_z$ terminals at a particular time. Accordingly, it is necessary to provide for sampling the output of the correlation network 166 appearing at terminal 182 at a time when the waveform representing a bit configuration is at the reference position of delay line 160. Sampling gates 184 and 186 in conjunction with inverter 187 provides for this sampling function.

The output signal appearing at terminal 182 of correlation summing means 166 is applied directly as one input to sampling gate 186 and inverted through inverter 187 for applying as an input to AND-gate 184. A signal identified as QCT3, occurring as illustrated in FIG. 7, is applied to a second input of AND-gates 184 and 186 such that the output of summing amplifier 180 is sampled at a reference position time corresponding to the reference position of a waveform in delay line 160. Since the output of summing amplifier 180 may provide either a positive or negative output signal depending upon which waveform appears in delay line 160 at the reference position time, it is necessary to employ inverter 187 for inverting a negative output signal such it may be applied to one input of AND-gate 184. In the case where a negative output has occurred, AND-gate 184 would be enabled at the conjunctive occurrence of a QCT3 signal to provide a positive output signal to one input of each of AND-gates 156 and 158.

The manner in which the correlation network 166 is connected to the terminals $T_w$, $T_x$, $T_y$ and $T_z$ will now be described. Since the correlation network 166 is designed in a manner so as to provide a sum signal for each bit configuration discrete waveform when it is stored in delay line 160, in its reference position, it is assumed that the relative voltage levels indicated in the graphs of FIG. 3 are present at terminals $T_w$, $T_x$, $T_y$ and $T_z$. These relative voltages are ideally 0, −1 and +1 depending upon which of the eight discrete waveforms is present at a particular sampling time. As noted before, the ordinates of the graphs have not been assigned units of voltage; this is because all voltages may be multiplied by an arbitrary constant without affecting the end result of the waveform recognition system. For example, in correlation network 166 resistors 168 may each have an equal resistance magnitude or value such that each of the input signals received from terminals $T_w$, $T_x$, $T_y$ and $T_z$ will be applied through resistors 168 at magnitudes proportionate to the magnitudes as appearing at terminals $T_w$, $T_x$, $T_y$ and $T_z$ to the positive and negative input terminals of summing amplifier 180. As is illustrated, the signals from terminals $T_w$ and $T_y$ are applied through resistors 168 to the negative input terminal of summing amplifier 180 and the signals present at terminals $T_x$ and $T_z$ are applied through resistors 168 to the positive input terminal of summing amplifier 180. This provides for a multiplication factor of, in the illustrated embodiment, −1 for the signals present at terminals $T_w$ and $T_y$ and +1 for the signals appearing at terminals $T_x$ and $T_z$. As previously described, the output sum signal at terminal 182 of correlation network 166 will have a relative numerical sum value in accordance with the relative sums provided in FIG. 1 corresponding to bit configurations 000 through 111 and having a minimum relative difference value of at least 1 between any other sum corresponding to a different bit configuration waveform. The correlation network is designed such that the output waveform relative sums appearing at terminal 182 will range from −3 to +4 in unity steps or increments in accordance with the relative sums illustrated in FIG. 1.

The particular factor by which each sample signal voltage is to be multiplied is introduced into the circuit by designing each coupling resistor to have a resistance value inversely proportional to that particular factor relative to the respective feedback resistor employed with summing amplifier 180. For example, if the resistance value of resistors 168 is 250 ohms and a feedback resistor has a resistance value of 1,000 ohms, a multiplication or weighting factor of 4 is provided for the sample voltage at a corresponding terminal $T_w$, $T_x$, $T_y$ or $T_z$. A more detailed description of the use of a current summing amplifier with feedback for multiplying several voltages which are to be added, each by a different constant, is given in "Electronic Analog Computers," by T. A. Korn et al., McGraw-Hill Book Company, New York, 1952) at pages 13 and 14.

The particular factor introduced by each of resistors 168 in correlation network 166 is designed to be a factor of 1. Therefore, in an illustrative embodiment utilizing idealized waveforms stored in delay line 160 wherein each of the waveform peak signal levels have an idealized sample level of −1 or +1, the resistance values of resistors 168 and a feedback resistor in summing amplifier 180 would have equal resistance values to provide a multiplication factor of 1. Since the voltage samples appearing at terminals $T_w$ and $T_y$ when the waveform in delay line 160 is at the reference position are coupled through resistors 168 to the negative input terminal of summing amplifier 180, the resulting multiplication factor would be −1, whereas the signal samples at terminals $T_x$ and $T_z$ being coupled through resistors 168 to the positive input terminal of summing amplifier 180 would provide a multiplication factor of +1 and the output resulting sum will be based upon those factors.

A reference waveform, which may be, by way of example, the waveform corresponding to a bit configuration of 111, may be employed wherein an analog waveform sample sum of a +4 relative value is obtained at output terminal 182 of correlation network 166. With reference to FIG. 1, it is, therefore, seen that −1 relative signals at terminals $T_w$ and $T_y$ applied to the negative input terminal of summing amplifier 180 summed together with +1 relative value sample signals at terminals $T_x$ and $T_z$ applied to the positive input terminal of summing amplified 180 will result in an analog waveform sample sum of +4. The current-summing amplifier circuit combines and inverts the signals applied to the negative input terminal in a first current-summing amplifier and employs a second current-summing amplifier which combines the resulting sum of the inverted negative input sample levels with the positive input sample levels to provide an output sum at output terminal 182 corresponding to the sum of the negative and the positive input sample signals.

A summing amplifier circuit suitable for use in the illustrated embodiment is disclosed in U. S. Pat. No. 3,148,336, issued Sept. 8, 1964, to R. E. Milford for a "Current Amplifier Providing Sum of Absolute Values of Signals," and to which reference is hereby made for a detailed description thereof.

A correlation network 166 may, therefore, be designed to provide an output sum signal level at terminal 182 representing a relative sample sum of +4 for a bit configuration of 111. This sum and correlation network 166 may then be used for correlating waveforms corresponding to each of the other bit configurations illustrated in FIG. 1 to provide a corresponding analog waveform sum having relative values as illustrated in FIG. 1.

In order that the correlation network 166 is assured to have a proper calibrated output signal level for the sum corresponding to each idealized discrete waveform, a calibration circuit 190 may be employed to provide for control of the gain of summing amplifier 180. The QCT0, QCT1 and $T_z$ sample level may be utilized to control the switching of a feedback resistance value to establish the gain of summing amplifier 180. The gain is established in a manner such that an input sample level occuring at either a $T_0$ or $T_1$ position of a cell may be utilized for comparison with a reference level to control selection of a desired amplifier gain to provide a required output sum level. With reference to FIG. 1, it is seen that a characteristic of the code is the occurrence of a pulse at either the $T_0$ or $T_1$ positions of each cell. Accordingly, calibration circuit 190 may respond to the $T_z$, QCT0 and QCT1 signals to establish a gain of summing amplifier 180 whereby a −1 or +1 level is converted to an absolute level value for comparison with the reference level to determine a difference signal which may then switch feedback resistance values into the amplifier to establish a corresponding output level. Calibration circuit 190 may, in this manner, respond to the absolute value of a sample signal level to provide for establishing the gain of summing amplifier 180 to provide an output sum signal corresponding to a corrected sum for the condition where waveform signal levels vary from idealized waveform levels.

Upon completion of correlating each waveform with a reference waveform established by the correlation network 166, an output signal sum corresponding to the relative values indicated in FIG. 1 is obtained for each of the eight different triplets or bit configurations and applied through either of AND-gates 184 or 186 in the manner previously described to one input of AND-gates 158 and 156 and 152 and 154, respectively. AND-gates 152, 154, 156 and 158 are controlled by the output of a POLARITY INVERT flip-flop 150 in order to maintain the convention previously described wherein the first flux reversal corresponding to a relative signal level of −1 must always occur at either a $T_0$ or $T_1$ position of each cell. It is, therefore, necessary to examine the polarity of a sample signal appearing at the $T_0$ or $T_1$ positions of each cell in order to determine if the first sample signal or peak level corresponding to a relative value of 1 is of a positive or a negative polarity. Since the convention establishes that the first level sample signal for each cell must be of a negative polarity, a plurality of polarity gates 20–203, a plurality of inverters 209 and 205, and a $T_0'$ flip-flop 206 are used in conjunction with POLARITY INVERT flip-flop 150 for determining whether the polarity of the output of summing amplifier 180 must be inverted prior to detection of the bit configuration represented by the waveform sum signal.

At the completion of recognition of each waveform, POLARITY INVERT flip-flop 150 is placed in a reset state by a high or enabling QCLR signal from the output of AND-gate 80 provided in a manner to be described hereinafter. Following the QCLR signal, the flip-flop 150 is in a reset state to provide a high or enabling NOT INVERT signal from its 0 output terminal to one input of AND-gates 156 and 158 preparatory to examining the polarity of the first peak level of a next waveform. When the sample level from terminal $T_z$ is of a positive polarity in conjunction with a QCTO high or enabling signal, AND-gate 201 will be enabled to provide a high or enabling signal to enable OR-gate 203 which, in turn, provides a high or enabling signal to the S input terminal of flip-flop 150. Flip-flop 150 is thereby placed in its set state indicating that the output sum signal must be inverted.

When the sample level from terminal $T_z$ is of a negative polarity, the sample level will be inverted through inverter 209 and AND-gate 202 will be enabled when a high or enabling QCTO signal is present to provide a high or enabling signal to the R terminal of the $T_0$ flip-flop 206. The $T_0$ flip-flop will thereby be placed in a reset state providing a low or enabling output signal to the input of AND-gate 200. Since a negative input level from terminal $T_2$ is present AND-gate 201 will not be enabled and POLARITY INVERT flip-flop 150 will remain in a reset state indicating a not invert condition due to the first peak level at $I_0$ position being of negative polarity.

When the sample level from terminal $T_2$ is of a zero level when a QCTO high or enabling signal is present, AND-gate 202 will not be enabled and a low or disabling output from AND-gate 202 will be applied to inverter 205 to the S input terminal of $T_0$ flip-flop 206 to place the $T_0$ flip-flop in a set state whereby one input to AND-gate 200 is at a high or enabling input level.

With reference to FIG. 1, when a zero level sample signal is detected corresponding to a $T_0$ position of a cell, it is necessary that the sample signal level occurring at a $T_1$ cell position be tested by AND-gate 200 to determine the presence of a positive or negative polarity input signal. In the event that a positive input signal follows a zero signal level at $T_0$ time, it will be necessary to provide for a polarity reset to maintain convention. Therefore, as previously described, the $T_0$ flip-flop will be placed in a set state upon detecting a zero level sample corresponding to a $T_0$ position of a cell. The one output terminal of flip-flop 206 will then provide a high or enabling input signal to AND-gate 200 and at the occurrence of a high or enabling QCT1 signal, a second high or enabling input to AND-gate 200 is provided. A third input to AND-gate 200 is provided from the $T_z$ output terminal of delay line 160 whereby the presence of a positive polarity sample signal corresponding to a $T_1$ cell position will enable AND-gate 200 to provide a high or enabling signal for enabling OR-gate 203. OR-gate 203 thereby provides a high or enabling signal to the S input terminal of flip-flop 150 for placing flip-flop 150 in its set state thereby providing a high or enabling INVERT signal from its 1-output terminal. Thus, POLARITY INVERT flip-flop 150 will be placed into its set state upon detecting the presence of a positive polarity sample level as being the first peak level of a waveform corresponding to a cell.

POLARITY INVERT flip-flop 150 in a set state provides a high or enabling output signal from its one output terminal to one input of INVERT AND-gates 152 and 158 which respond to positive and negative output sum signals, respectively, to invert the sum of the output of correlation summing means 166. The actual inversion is accomplished by inverters 187 and 159 which invert a negative output sum and a positive output sum, respectively. When POLARITY INVERT flip-flop 150 remains in a reset state following the testing at $T_0$ and $T_1$ positions by the presence of QCT0 and QCT1 signals, the 0 output terminal will provide a high or enabling output signal to one input of AND-gates 154 and 156 which provide for applying the positive and negative output sum signal from correlation summing means 166, respectively, to a junction point 161.

In the case of the negative sum level being controlled by the output of POLARITY INVERT flip-flop 150, the negative sum must be first inverted through inverter 187 and gated through AND-gate 184 for applying as a high or enabling signal to one input of AND-gate 156 and then inverted back to a negative polarity through inverter 159 for applying to the output junction point 161.

A properly polarized correlation network 166 output sum is now present at junction point 161 and applied on a plurality of leads in parallel to a comparator or plurality of quantizers 90–97 corresponding to QUANTIZERS 111–100, respectively, as illustrated in FIG. 5. Each quantizer receives a sum level signal which will have a relative value of between −3 and +4, as illustrated in FIG. 1, corresponding to one of the eight triplets or bit configurations illustrated in FIG. 1. Each of quantizers 90–97 may be a convention quantizer or voltage level comparator. The quantizer may be made in numerous ways, for instance, it may be a Schmidt trigger or an analogous circuit. The Schmidt trigger or analogous circuit may, for example, respond to a signal within a predetermined range of generated compare signals or between predetermined range of threshold signal levels to provide an output pulse. For example, quantizer 91 corresponding to a bit configuration of 111 may respond to a sum signal in a range of from between +3.5 to +4.5 volts to provide a high or enabling comparison output signal pulse. Quantizer 91 corresponding to a bit configuration of 110 may respond to a threshold or comparison signal voltage range of +2.5 to +3.5 volts to provide an output signal pulse. In a similar manner, each of quantizers 92–97 may respond to a sum signal within a predetermined different range of compare signals or between a range of threshold levels to provide comparison output signal pulses.

Thus, a plurality of different ranges of compare signals are generated by a compare signal generator 120 or ranges of threshold levels established, and a different one of the ranges employed within each of quantizers 90–97. The ranges may, by way of example, be progressively increasing by increments in magnitude corresponding to known digital values such as by equal increments or unity increments corresponding to the unity increments of increase in the eight sum signals. The eight sum signals may, as previously described, correspond to the eight discrete waveforms representing the eight triplets or bit configurations from 000 to 111 and having decimal digit values from 0 to 7.

Comparison output signals or signal pulses from quantizers 90–97 are applied to a waveform selector 98 which functions to determine the quantizer delivering the one comparison output signal pulse corresponding to a range most closely corresponding to the sum signal which, in turn, corresponds to the waveform representing a bit configuration which has been read. Waveform selector 98 may be, by way of example, a conventional priority network comprising a plurality of flip-flops, one flip-flop corresponding to each quantizer output signal pulse and being in an arrangement whereby a quantizer output signal pulse assigned to a sum signal having a magnitude of higher level will provide for resetting all flip-flops corresponding to quantizers representing a sum signal having a magnitude of lower level. Waveform selector 98, therefore, provides an output signal on only the the one of the output leads 210–217 corresponding to the one waveform which has been recognized as having been present at the reference position of delay line 160.

A suitable waveform selector is disclosed in U. S. Pat. No. 3,395,394, issued July 30, 1968, to W. Cottrell for a "Priority Selector" and to which reference is hereby made for a detailed description thereof.

Signals from waveform selector 98 on leads 210 through 217 are applied to an encoding matrix 100. The one signal applied on one of lines 210 through 217 at any one time will be of a high or enabling level which will be converted to a plurality of three output digit signals corresponding to the binary digits or bit configurations represented by the waveform which has been recognized.

The three output digit signals on leads R1, R2 and R3 from encoding matrix 100 will have high or enabling levels and low or disabling levels in a pattern corresponding to the binary digit or bit configuration for the waveform detected. For example, if the reference waveform corresponding to a 111 binary bit digit configuration has provided a sum level of +4 from the output of correlation network 166, quantizer 90 will be enabled to provide a comparison output signal pulse to waveform selector 98. Similarly, since a +4 relative signal level exceeds the threshold level of each of quantizers 91–97, each of quantizers 91–97 will provide an output signal pulse to waveform selector 98. Waveform selector 98 will then resolve the priorities based upon the highest threshold quantizer level or range of compare signals most closely corresponding to the sum signal and will provide an output signal on one of leads 210–217 which, in the case of a pulse from quantizer 90, would result in a high or enabling output signal on lead 210 to encoding matrix 100.

Figure 8:
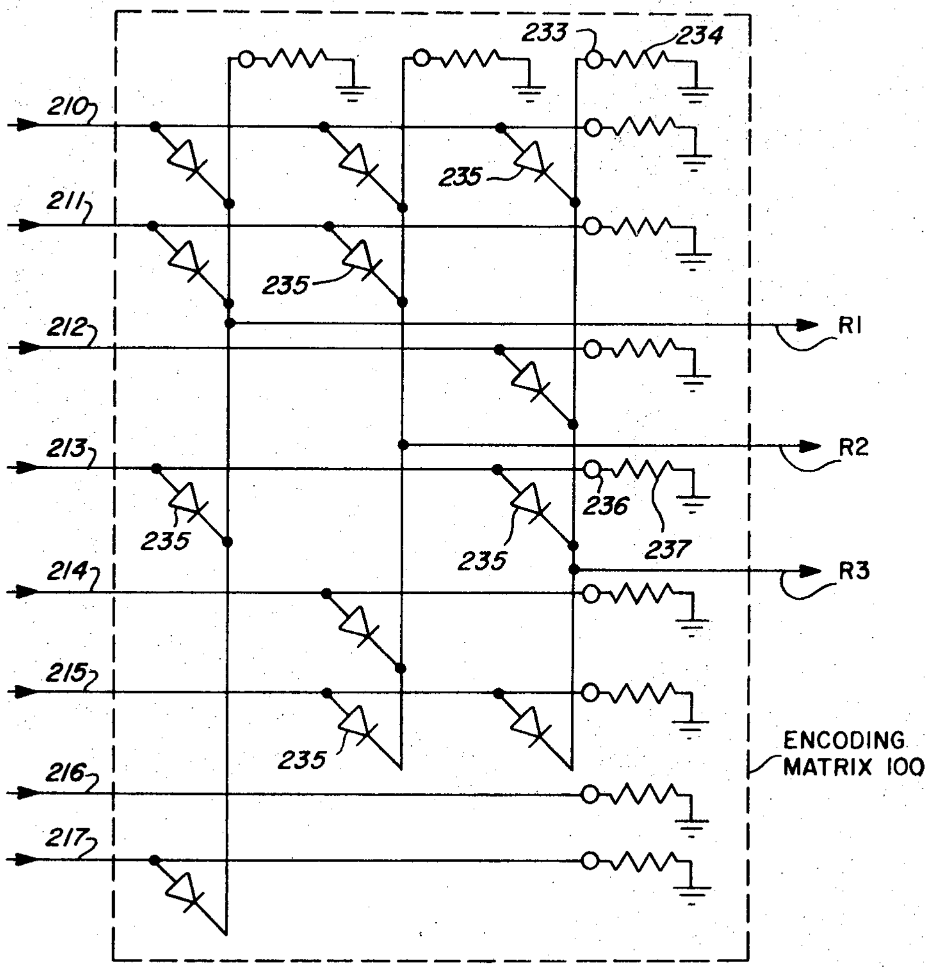
FIG. 8 is a schematic diagram illustrating an encoding matrix or converter suitable for use in implementing the present invention.

Encoding matrix 100, as illustrated in FIG. 8, may be comprised, by way of example, of diodes 235 arranged in columns and rows and have negatively biased resistors connected to diode column junctions and diode row junctions, such as column junction resistor 234 connected to column junction 233 and row junction resistor 237 connected to column junction 233 and row junction resistor 237 connected to row junction 236. The encoding matrix or converter 100 thus comprises a matrix of rectifying diodes arranged in columns and rows. The arrangement of the diodes is determined by the binary digit configuration corresponding to the output leads R1, R2 and R3. The columns represent bits and the rows represent waveforms. Each of the rows of diodes within the matrix, as shown in FIG. 8, has the anodes of its diodes joined to a junction such as junction 236, of the output lead of one of the leads 210–217 from waveform selector 98 and a negatively biased resistor, such as resistor 237, having a resistance value inversely proportional to the number of diodes in the row.

When a high or enabling signal is applied on lead 210 corresponding to a high or enabling input signal from quantizer 90, each of the diodes 235 which have an anode connected to lead 210 will be forward biased providing a high or enabling signal on each of output leads R1–R3, corresponding to a 111 binary digit configuration. Similarly, whenever a high or enabling signal is applied on leads 211 through 217 corresponding to a pulse from one of quantizers 90 through 97, respectively, a row of diodes having anodes connected to the lead will be forward biased to provide a high or enabling signal on connected output leads R1, R2 and R3 corresponding to the bit configuration.

During the occurrence of a DCT3 signal and the entry of the quantizer output signal pulses into the flip-flops of the waveform selector 98, FIG. 5, it is required that the content of the selector flip-flip corresponding to the magnitude of the sum signal representing the waveform recognized provide a selected signal on one of leads 210 through 217. The selected signal is then encoded or converted to provide output digit signals on lines R1 through R3 for entry in parallel into flip-flops D0 through D2 of data register 55, FIG. 4. The QXBD signal from the output terminal of AND-gate 82 and delay means 86, is provided as previously described, for transmitting a high or enabling output signal to one input terminal of each of AND-gates 102, 103 and 104. Gates 102–104 are thereby selectively enabled in accordance with the presence of high or enabling digit signals on respective ones of leads R1, R2 and R3 to provide high or enabling signals representing the encoded content of a waveform selector flip-flop for entry into data register 55.

After entry of the encoded triplet or bit configuration into the data register, the waveform selector flip-flops are cleared by placing each of the flip-flops in a reset state prior to the occurrence of the next QCT3 signal when a next sample sum from a next waveform is applied to quantizers 90–97. This is accomplished at the end of the DCT3 time when the QCLR signal is provided by AND-gate 80 at the time illustrated in FIG. 7. At the conjunctive occurrence of a QFUL signal and the DCT3 signal, AND-gate 80 is enabled to provide a high or enabling QCLR signal which is simultaneously applied to each of the flip-flops in waveform selector 98 for placing each of the flip-flops in waveform selector 98 for placing each of the flip-flops in a reset state prior to the occurrence of a next pulse from one or more of quantizers 90–97.

At the occurrence of each succeeding QCT3 signal, the reading of a next waveform is initiated and the corresponding signal pulses resulting from a sum signal applied to quantizers 90–97 will be entered into a waveform selector flip-flop. The content of a waveform selector flip-flop applied to encoding matrix 100 then results in digit signals which are entered into data register 55, from which the digit signals or contents of the data register are available for transfer by means of data bus 54 to sequencer and data supply unit 50. Sequencer and data supply unit 50, may, by way of example, upon detecting the QCLR signal, provide for the further transfer of the received contents of data register 55 to the data processing circuit by means of bus 52.

Thus, in accordance with the invention claimed a new and improved high-density data storage and retrieval system and method for retrieving stored data is provided in which interference errors are greatly reduced by analog waveform recognition or recorded bit configurations utilizing correlation of the waveform with a reference waveform wherein interference signals due to spurious signals are substantially cancelled to eliminate or substantially reduce their interfering effects. A data retrieval system utilizing a more economical waveform recognition system is also provided in which one correlation summing means is utilized for providing a different output sum signal corresponding to each of a plurality of discrete waveforms. The sum signals may then be individually detected as corresponding to a recognized bit configuration without requiring the need for a separate correlation summing means to detect and recognize each waveform corresponding to each one of a plurality of bit configurations.

While the principles of the invention have now been made clear in an illustrative embodiment, there will be immediately obvious to those skilled in the art many modifications of structure, arrangement, proportions, the elements, materials and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

What is claimed is:

1. A method for producing output signals indicative of stored binary information stored in a pattern of representations corresponding to a succession of groups of binary digits, comprising the steps of:

producing one discrete waveform corresponding to each of said groups of binary digits;

generating unique sets of sample signals, each of said unique sets corresponding to one of said discrete waveforms and each sample signal in each of said unique sets being directly related in magnitude to the amplitude of a critical point on the corresponding discrete waveform;

generating a sum signal corresponding in magnitude to the summation of the sample signals in one of said unique sets;

generating a plurality of ranges of compare signals progressively increasing in magnitude by increments directly related to known digital values; and selecting from said plurality of ranges that particular range most closely corresponding to the magnitude of said sum signal and providing in response to said selection an output signal indicative of a particular group of binary digits.

2. The method of claim 1 wherein the step of generating unique sets of sample signals is achieved by simultaneously detecting the amplitudes of the critical points on said corresponding discrete waveform.

3. The method of claim 1 comprising the further step of converting said output signal into a plurality of digit signals, each of said digit signals representing a bit configuration corresponding to said particular group of binary digits.

4. The method of claim 1 wherein the step of producing one discrete waveform is achieved by sensing said pattern of representations and producing one discrete waveform corresponding to each of eight groups of binary digits having decimal digit values of from 0 to 7, each of said groups being one of eight triplets of binary digits; the step of generating unique sets of sample signals is achieved by detecting the amplitudes of the critical points on eight corresponding discrete waveforms, each of said unique sets corresponding to one of said eight discrete waveforms; and the step of generating a sum signal is achieved by the summation of the sample signals in a particular one of said unique sets, said sum signal corresponding in magnitude to the summation of the sample signals in said particular unique set and said unique sets corresponding to eight sum signals progressively increasing in magnitude by equal increments.

5. The method of claim 4 wherein the step of generating a sum signal is achieved by summing and amplifying the sample signals in a particular one of said unique sets, said sum signal corresponding in magnitude to the amplified summation of the sample signals in said particular unique set and said eight sum signals progressively increasing in magnitude by equal increments corresponding to said known digital values.

6. The method of claim 4 wherein the step of generating a sum signal is achieved by summing and amplifying the sample signals in a particular one of said unique sets, each sample signal in said particular unique set being amplified by one of a plurality of predetermined weighting factors, said sum signal corresponding in magnitude to the amplified summation of the sample signals in said particular unique set and said eight sum signals progressively increasing in magnitude by equal increments of unity digital value.

7. An information storage system wherein binary information is stored in a record medium in a pattern of representations corresponding to a succession of groups of binary digits, comprising in combination:

sensing means for sensing said pattern of representations and for producing an electrical signal having one discrete waveform corresponding to each of said groups of binary digits;

sampling means for simultaneously detecting amplitudes at a plurality of critical points on said discrete waveform and providing a corresponding unique set of sample signals for each discrete waveform, each sample signal in each unique set being directly related in magnitude to the amplitude of a critical point on said discrete waveform; and summing means for receiving each unique set of sample signals and for providing in response to each unique set a sum signal corresponding in magnitude to the summation of the amplitudes of the sample signals in each unique set said sum signal representing a pattern of representations sensed.

8. The system of claim 7 further comprising a selection means for selecting from a plurality of ranges of compare signals progressively increasing in magnitude by increments corresponding to known digital values that particular range most closely corresponding to the magnitude of said sum signal and providing in response to the selection an output signal corresponding to a particular group of binary digits.

9. The system of claim 7 wherein said information storage system is a magnetic storage system, said representations are presences and absences of transitions in said record medium and said groups are triplets.

10. A magnetic storage system wherein binary information is recorded in a medium in a pattern of presences and absences of transitions corresponding to a succession of triplets of binary digits, each of said triplets being one of eight triplets of binary digits having decimal digit values of from 0 to 7, comprising in combination:

sensing means for sensing said pattern of presences and absences of transitions and producing an electrical signal having eight discrete waveforms, one of said eight discrete waveforms corresponding to each of said eight triplets of binary digits;

sampling means for simultaneously detecting amplitudes at a plurality of critical points on each one of said eight discrete waveforms successively and for successively providing a corresponding one of eight unique sets of sample signals for each discrete waveform, each sample signal in each one of said eight unique sets being directly related in magnitude to the amplitude of a critical point on said one of said eight discrete waveforms; and summing means for receiving each one of said eight unique sets successively and for successively providing in response to each one of said eight unique sets a particular one of eight sum signals corresponding in magnitude to the summation of the amplitudes of the sample signals in said one of said eight unique sets, said eight sum signals progressively increasing in magnitude by equal increments directly related to known digital values and said particular one of said eight sum signals representing a pattern of presences and absences of transitions sensed.

11. A magnetic storage system wherein self-clocking binary information is recorded in a medium along a track in a pattern of presences and absences of transitions corresponding to a succession of triplets of binary digits, each of said triplets being recorded in the next four successive transition positions in said track following the four transition positions in which the pattern representing the preceding triplet of binary digits is recorded in a manner such that no more than two sequential transition positions occur without a transition whereby different combinations of presences and absences of transitions in four successive positions along said track correspond to different triplets of binary digits, comprising in combination:

sensing means for detecting magnetic flux that is representative of the pattern of presences and absences of said transitions in each of said four successive positions along said track and for producing an electrical signal having one discrete waveform corresponding to each of said triplets of binary digits;

sampling means for simultaneously detecting amplitudes at a plurality of critical points on said discrete waveform and providing a corresponding unique set of sample signals for each discrete waveform;

a summing means for receiving each unique set of sample signals and being responsive to each unique set of sample signals to provide a sum signal having a magnitude directly related to the summation of the amplitudes of each unique set; and selection means for selecting from a plurality of ranges of compare signals progressively increasing in magnitude by increments corresponding to known digital values, that particular range most closely corresponding to the magnitude of said sum signal and in response to the comparison providing an output signal corresponding to a particular pattern of presences and absences of transitions in each of said four successive positions sensed.

12. A magnetic storage system wherein self-clocking binary information is recorded in a medium along a track in a succession of triplets of binary digits, each of said triplet being recorded in the next four successive transition positions in said track following the four transition positions in which the pattern representing the preceding triplet of binary digits is recorded in a manner such that no more than two sequential transition positions occur without a transition whereby different combinations of presences and absences of transitions in four successive positions along said track correspond to different ones of eight triplets of binary digits, comprising in combination:

sensing means for detecting magnetic flux that is representative of the pattern of presences and absences of said transitions in each of said four successive positions along said track and for producing an electrical signal having eight discrete waveforms, one of said eight discrete waveforms corresponding to each of said eight triplets of binary digits;

sampling means for simultaneously detecting amplitudes at a plurality of critical points on each one of said eight discrete waveforms successively and for successively providing a corresponding one of eight unique sets of sample signals for each of said eight discrete waveforms, each sample signal in each of said eight unique sets being directly related in magnitude to the amplitude of a critical point on said one of said eight discrete waveforms;

a summing means for receiving each one of said eight unique sets successively and for successively providing in response to each one of said eight unique sets a particular one of eight sum signals corresponding in magnitude to the summation of the amplitudes of the sample signals in said one of said eight unique sets, said eight sum signals progressively increasing in magnitude by equal increments; and selection means for selecting from a plurality of ranges of compare signals progressively increasing in magnitude by increments corresponding to known digital values, that particular range most closely corresponding to the magnitude of said particular one of eight sum signals and in response to the comparison providing an output signal corresponding to a particular pattern of presences and absences of transitions in each of said four successive positions sensed.

13. The combination set forth in claim 12 wherein said eight sum signals progressively increase in magnitude by unity increments.

14. A magnetic storage system wherein binary information is recorded in a medium along a track in a pattern of presences and absences of transitions corresponding to a succession of triplets of binary digits, comprising in combination:

binary means for sensing magnetic flux representative of the pattern of presences and absences of said transitions and for producing an electrical signal having one discrete waveform corresponding to each of said triplets of binary digits;

sampling means for simultaneously detecting amplitudes at a plurality of critical points on said discrete waveform, said sampling means having an input terminal for receiving each discrete waveform and a plurality of output terminals for simultaneously delivering a corresponding unique set of sample signals for each discrete waveform, each sample signal in each unique set being directly related in magnitude to the amplitude of a critical point on said discrete waveform;

a correlation network including a current-summing means and a plurality of impedance means, one of said impedance means connected between each one of certain of said output terminals and said current-summing means, the quantity of impedance of the impedance means between each one of said certain terminals and said summing means being of a quantity to weight each sample signal applied through one of said impedance means to said current-summing means by a predetermined weighting factor, said current-summing means receiving each unique set of weighted sample signals and for providing in response to each unique set a sum signal directly related in magnitude to the summation of the amplitudes of the sample signals in each unique set; and selection means for selecting from a plurality of ranges of compare signals progressively increasing in magnitude by increments corresponding to known digital values, that particular range most closely corresponding to the magnitude of said sum signal, and providing in response to the comparison an output signal corresponding to a particular triplet of digits.

15. The combination set forth in claim 14 wherein an even number of said sample signals are delivered in each unique set and one of said impedance means are connected between each one of a first plurality of said output terminals and a negative input terminal of said summing means and one of said impedance means is connected between each one of a second plurality of said output terminals and a positive input terminal of said summing means, said first second plurality of said output terminals being equal in number whereby noise signals common to each of said output, positive input and negative input terminals are cancelled.

16. The combination set forth in claim 14 wherein one of a first plurality of said impedance means is connected between each one of a first plurality of said output terminals and a negative input terminal of said summing means; one of a second plurality of said impedance means is connected between each one of a second plurality of said impedance means is connected between each one of a second plurality of said output terminals and a positive input terminal of said summing means; and the quantity of impedance of each one of first plurality and second plurality of said impedance means being of a quantity to weight a sample signal applied through one said first plurality of said impedance means to said positive input terminal by a weighting factor of +1 and to weight a sample signal applied through one of said second plurality of said impedance means to said negative input terminal by a weighting factor of −1.

17. A magnetic storage system wherein binary information is recorded in a medium along a track in a pattern of presences and absences of transitions corresponding to a succession of triplets of binary digits, comprising in combination:

sensing means for detecting magnetic flux that is representative of the pattern of presences and absences of said transitions and for producing in response to said transitions an electrical signal having one discrete waveform corresponding to each of said triplets of digits;

sampling means for simultaneously detecting amplitudes at a plurality of critical points on said discrete waveform, and providing a corresponding unique set of sample signals for each discrete waveform, each sample signal in each unique set being directly related in magnitude to the amplitude of a critical point on said discrete waveform;

a correlation network including a current-summing means for receiving each unique set of sample signals and being responsive to each unique set of sample signals for providing a sum signal corresponding in magnitude to the summation of the amplitudes of the sample signals in each unique set;

a plurality of threshold means, each of said threshold means receiving said sum signal and responding to a sum signal having a magnitude within a predetermined range of threshold levels to provide an output signal, said range within which each of said plurality of threshold means responds progressively increasing in magnitude by increments corresponding to known digital values;

a selector for receiving said output signal from each of said threshold means responding, said selector selecting the one of said output signals corresponding to that particular range most closely corresponding to the magnitude of said sum signal and providing in response to the selection a selected signal corresponding to a particular triplet of digits sensed; and conversion means for receiving said selected signal and responding to said selected signal to provide a plurality of digit signals representing a particular triplet of digits.

18. A magnetic storage system wherein self-clocking binary information is recorded in a medium along a track in a pattern of presences and absences of transitions corresponding to a succession of triplets of binary digits, each of said triplets being recorded in the next four successive transition positions of a cell in said track following the four transition positions of a cell in which the pattern representing the preceding triplet of binary digits is recorded in a manner such that no more than two sequential transition positions occur without a transition whereby different combinations of presences and absences of transitions in four successive positions along said track correspond to eight triplets of binary digits having decimal digit values of from 0 to 7 comprising in combination:

sensing means for detecting magnetic flux that is representative of the pattern of presences or absences of said transitions in each of said four successive positions along said track and for producing in response to said transitions an electrical signal having eight discrete waveforms, one of said eight discrete waveforms corresponding to each of said triplets of binary digits;

a delay line for receiving said discrete waveform and for simultaneously detecting amplitudes at a plurality of critical points on said discrete waveform, said delay line having an input terminal for receiving any one of said eight discrete waveforms successively and a plurality of output terminals for successively and simultaneously delivering a corresponding one of eight unique sets of sample signals for each discrete waveform, at least one of said sample signals of each one of said unique sets being of a positive polarity with respect to a reference level and at least one of said samples of each one of said unique sets being of a negative polarity with respect to said reference level, and each sample signal in each one of said eight unique sets being directly related in magnitude to the amplitude of a critical point on said one of said eight discrete waveforms;

a correlation network including a current-summing amplifier having a positive and a negative input terminal, an output terminal, and one of a first plurality of impedance elements connected between each one of a first plurality of said output terminals and said positive input terminal, and one of a second plurality of impedance elements connected between each one of a second plurality of said output terminals and the negative input terminal, the quantity of impedance of each of said first and second plurality of impedance elements being substantially equal for weighting each sample signal of said eight discrete waveforms by a predetermined weighting factor, said current-summing amplifier successively receiving each one of said unique sets of weighted sample signals and successively delivering at its output terminal in response to each one of said eight unique sets one of eight sum signals, a particular one of said eight sum signals being proportional in magnitude to the summation of the amplitudes of the sample signals in said one of said eight unique sets of weighted sample signals applied through said first and second plurality of impedance elements to said positive and negative input terminals to effectively cancel noise signals common to each sample signal of each one of said eight unique sets, and said eight sum signals progressively increasing in magnitude by equal increments;

a polarity detection means for receiving said sample signals and for detecting in response to said sample signals the presence of a sample signal having a negative polarity representative of a transition at a fourth transition position in any four successive positions corresponding to one of said eight triplets and for providing in response to the detecting of said negative polarity representation an invert signal;

gating means for receiving said sum signal and said invert signal and being responsive during the presence of said invert signal to invert the polarity of said sum signal for providing an inverted sum signal and being responsive during the absence of said invert signal for providing said sum signal;

a plurality of threshold means, each of said threshold means receiving said inverted sum signal and said sum signal and responding to an inverted sum signal and a sum signal having a magnitude within a predetermined range of threshold levels to provide an output signal, said range within which each of said plurality of threshold means responds progressively increasing in magnitude by increments corresponding to known digital values;

a selector for receiving said output signal from each of said threshold means responding and being responsive for selecting the one of said output signals corresponding to that particular range most closely corresponding to the magnitude of said sum signal and providing in response to the selection a selected signal; and a converter for receiving said selected signal and responding to said selected signal to provide a plurality of digit signals representing one of said eight triplets of digits corresponding to the particular pattern of presences and absence of transitions sensed.